United States Patent Office 2,822,990
Patented Feb. 11, 1958

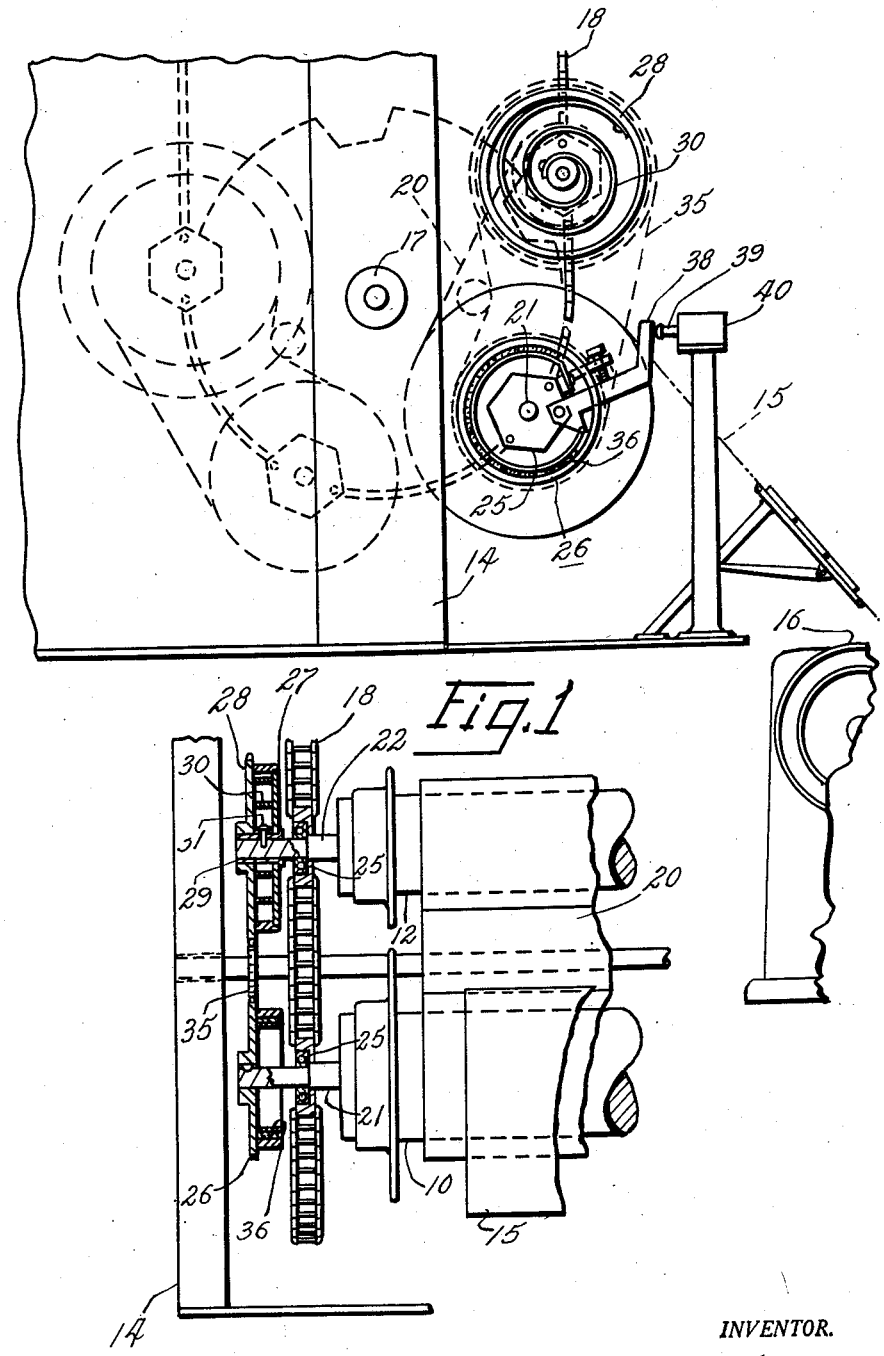

2,822,990

TIRE BUILDING APPARATUS

Edward C. Kastner, Akron, Ohio, assignor to Akron Standard Mold Company, Akron, Ohio, a corporation of Ohio Application October 21, 1954, Serial No. 463,777

2 Claims. (Cl. 242—67.3)

This invention relates to a tire building apparatus and more particularly relates to an improved mechanism for delivering sheet material from a roll having an interwound backing sheet or liner.

An exemplary form of tire building apparatus to which this improved mechanism may be applied is shown in United States Letters Patent 2,242,810 issued to Henry C. Bostwick on May 20, 1941. A principal difficulty in this and similar types of tire building apparatus resides in the fact that the cross grain of the building material is stretched and distorted by the drawing action of the tire building drum. Attempts have been made to overcome such distortion as for example by maintaining a constant tension on the material and liner. However, such constant tension arrangements do not offset the positive drawing force acting against the cross grain of the building material.

Accordingly, it is a principal object of this invention to relieve the drawing force of the tire building drum by providing a tractor mechanism which positively feeds the tire building material from the rolls onto the tire building drum.

A further object of this invention resides in the provision of a tractor mechanism for positively driving out the tire building material from the supply roll while at the same time maintaining a substantially constant tension on the liner.

Other objects and advantageous features of this invention will become apparent in the following description and claims.

Briefly, in accordance with this invention, there is provided a pair of rolls, one of which carries a supply of tire building material having a tacky surface interwound with a liner which is intended to be wound up on the other roll as the tire building material is fed onto the tire building drum. Each roll is mounted on a shaft which is rotatably supported in parallel spaced relation from the other. The supply roll shaft carries a fixed sprocket at one end while the liner shaft carries a freely rotatable sprocket adjacent the same end; the two sprockets being interconnected by means of a suitable belt or sprocket chain. A motor member in the form of a spiral spring has one end secured to the liner shaft and the other end secured to the liner sprocket in such manner that potential energy may be stored in the spring by winding the liner sprocket around the liner shaft. The liner shaft is held fixed through the liner which is held fixed on the supply roll by means of a releasable brake mechanism acting against the supply shaft sprocket. The sprocket and the supply and liner roll dimensions are selected to provide a system gear ratio which, upon release of the brake mechanism, will cause the motor member to positively drive the supply roll in a direction to feed the tire building material onto the tire building drum and at the same time wind the liner on the liner roll. The dimensional relationship between the sprockets and the rolls is also related to the loading on the spiral spring in a manner to provide a differential spring action which will maintain a constant tension on the liner as the stock material is fed from the supply roll.

In the drawings:

Fig. 1 is a side elevation of the lower portion of the turret mechanism of a tire building apparatus illustrating the application of the invention to a set of supply and liner rolls;

And Fig. 2 is a view of one end of the supply and liner rolls illustrating in partial section the feed mechanism of this invention.

Referring now more particularly to Figs. 1 and 2 of the drawings, the full line representation of the supply and liner rolls 10 and 12 illustrates an exemplary application of this invention; it being understood that such application may be repeated on each set of rolls carried by the turret frame 14. In most cases, as shown in the above mentioned patent, several sets of supply and liner rolls are carried by the turret frame 14 and mounted for movement as a unit in an endless path; the arrangement being such that when the stock supply rolls are placed adjacent a discharge or unloading station and are exhausted of the tire building material 15, the entire multistock unit may be indexed or otherwise positioned to present another set of loaded or charged supply rolls at the unloading station, while the set of exhausted rolls is moved to a loading or charging station where they may again be filled with the stock material. The multi-stock unit is rotatably mounted within suitable bearings 17 in spaced vertical turret standards forming the turret frame 14 and is driven through the medium of a sprocket chain 18 to present successive pairs of liner storing and stock delivery rolls at the loading station in a manner more fully described in the above-mentioned patent.

The stock roll 10 carries the tire building materials 15 having a tacky surface interleaved with a liner 20. When a set of supply and liner rolls is positioned at an unloading station as shown in full lines in Fig. 1, a free end of the liner 20 is secured to the liner roll 12 so that as the stock roll 10 is unwound the liner 20 is wound on the liner roll 12. In the conventional tire building apparatus the stock material 15 is pulled or drawn from the stock roll 10 by a tire building drum 16 and a suitable pulley or sprocket assembly is provided to cause the liner 20 to be wrapped about the liner roll 12 as the stock material is drawn off the stock supply roll. In accordance with this invention, the stock material is positively fed to the tire-building drum in a manner to be hereinafter more fully described.

As best shown in Fig. 2, the stock and liner rolls 10 and 12 are carried respectively by spaced parallel shafts 21 and 22 whose end extremities are journaled for rotation in axially spaced bearing blocks 25 carried by the turret chain 18. The liner sheet 20 has its ends attached to the respective rolls and winds in opposite directions about the two rolls, that is, in a clockwise spiral on the liner roll and counterclockwise on the supply roll as viewed in Fig. 1 of the drawings. The sprocket assembly includes a pair of deep-flanged sprocket wheels 26 and 28 which may be covered by detachable guard casings 27 to enclose a spiral spring and brake mechanism respectively for operation in a manner to be hereinafter more fully described. The smaller sprocket wheel 26 is fixed on an end of the stock roll shaft 21 and the larger sprocket wheel 28 is journaled for free rotation on a bearing sleeve 29 carried by the same end of the liner roll shaft 22.

The tractor mechanism for driving the sprocket assembly includes a motor member in the form of a spiral spring steel tape 30 which is wound about the liner roll shaft 22 within the enclosed flange of the liner sprocket wheel 28. One end of the spring is secured to the liner roll shaft 22 by a pin 31 passing through the sleeve bearing 29 and the other end is secured to the flange of the sprocket wheel 28 so that when wound it can act in the fashion of a clock spring between the liner roll 12 and the liner sprocket wheel 28. The motive force of the spring is applied to the supply roll 10 through the medium of a sprocket chain 35 interconnecting the two sprocket wheels, and positively feeds the stock material to the tire-building drum 16. The liner connection between the two rolls completes the system which can be self-motivated by releasing the loaded spring motor member in a manner to be hereinafter more fully described.

The entire system is releasably immobilized by means of a movable friction brake band 36 which is disposed within and spring biased against the flanged portion of the stock roll sprocket wheel 26. One end of the brake band 36 is fixed relative to the sprocket wheel 26 while the other end is connected to an adjacent extremity of a brake lever 38 which is pivoted to the corresponding bearing block. The brake lever 38 can be manually or automatically positioned to move the brake band 36 away from its normally biased position against the sprocket wheel flange to release the interconnected system of rolls and sprocket wheels for rotation by the motor spring 30. In the preferred form shown in the drawings, the other extremity of the brake lever 38 extends outwardly into engagement with a rod 39 which is adapted to move axially under the influence of a remotely controlled solenoid or similar device 40.

I have found that for the motor spring 30 to rotate the stock roll 10 in the proper direction for discharge of the tire building material free of tension and at the same time to cause the liner to wind up on the liner roll 12 under substantially constant tension there must be a predetermined dimensional relationship maintained between the sizes of the sprocket wheels 26 and 28 and the corresponding stock and liner rolls. This dimensional relationship can be expressed in terms of sprocket and roll diameters and is such that the ratio of the stock roll sprocket wheel diameter to the liner roll sprocket wheel diameter is less than the ratio of the stock roll diameter to the liner roll diameter. Since the stock roll 10 decreases in its diametric proportion during the unloading operation, while the liner roll 12 increases in its diametric proportion, the foregoing dimensional relationship should be established so that it will be maintained throughout the entire operation, that is, it should prevail when the stock and the liner rolls are each loaded and unloaded.

Assuming, for a given set of stock and liner rolls, that the liner 20 is completely wound up on a liner roll 12 and that there is no tire-building material on a corresponding stock supply roll 10. In this condition, the spring 30 will be unwound. This set of rolls may be moved to a loading station for charging as hereinbefore described. At the loading station, the free end of liner 20 is placed upon the stock roll 10 together with the free end of a sheet of tire building material 15. The stock roll 10 is then rotated in a counter-clockwise direction by some external means not shown. This causes the liner 20 and the tire-building material 15 to be wound in interleaved relation on the stock roll 10. During this winding or loading operation, the liner 20 rotates the liner roll shaft 22 in a counter-clockwise direction. Thus, the inner end of the spring 30 will also be rotated in a counter-clockwise direction. Since the sprocket wheel 26 is fixed on the stock roll shaft 21, it will rotate with the stock roll 10 and this rotation is imparted to the sprocket wheel 28 through the connecting sprocket chain 35. However, the sprocket wheel 28 is free to rotate on the liner roll shaft 22 and, because it is of larger diameter than the sprocket wheel 26, the outer end of the spring 30 will not rotate as fast as the inner end of the spring, thereby winding the spring.

When the winding force is removed from the stock roll 10, as is the case when the loaded stock roll and corresponding empty liner roll are positioned at the unloading station adjacent the tire-building drum 16, and after the brake band 36 is released, the wound up spring 30 will release its stored energy and will positively drive the interwound liner and tire-building material out of the loaded stock roll 10. This occurs because the spring 30, in trying to unwind, exerts a clockwise force through its inner end on the shaft 22 and exerts a counter-clockwise force through its outer end on the sprocket wheel 28 which is transferred to the chain 35 to the sprocket wheel 26 and stock roll 10. This puts the liner 20 in tension and, because of the difference in diameters between the larger stock roll 10 and smaller liner roll 12, the liner roll 12 will rotate faster than the stock roll 10 and will cause the inner end of the spring 30 to unwind faster than the outer end. As a result, the entire system is pulled in a clockwise direction to discharge the tire-building material 15 and to wind up the liner 20 on the liner roll 12. As the rolls continue to turn under the influence of the unwinding spring 30, the liner roll 12 grows in size and the stock roll 10 decreases in size and the rate of unwinding of each end of the spring approaches the other until the spring is substantially unwound. Actually, because of the dimensional relationships in the system, the spring 30 is never completely unwound, but the amount of the spring drive at the end of the run will be only a fraction of what it was at the beginning of the run; the dimensional relationship being so chosen, however, that the drive is sufficient throughout the run to operate in the aforesaid manner.

By way of example, I have found that for a stock roll that measures 8 inches when full and an empty 4 inch liner roll the tractor mechanism is operative in the desired manner when the stock roll sprocket has 33 teeth and the liner sprocket has 54 teeth. The loaded spring will exert a clockwise pull on the liner roll from its inner end which is secured to the liner roll shaft on a 1 inch diameter sleeve bearing, while at the same time exerting a counter-clockwise pull from its outer end which is transferred through the chain and sprockets to the stock roll. With this dimensional relationship the operation is such that for one revolution of the stock roll in transferring liner to the liner roll, the liner roll will make two revolutions. The gear ratio of the 33 tooth stock roll sprocket to the 54 tooth liner roll sprocket in the above example makes the outer end of the spiral spring turn approximately 0.61 of a full revolution for one revolution of the stock roll. The amount of liner leaving the stock roll, however, allows the liner roll and the inner end of the spiral spring to turn two revolutions for each revolution of the stock roll, and the spring unwinds approximately 1.39 turns for each revolution of the stock roll. As the rolls continue to turn under the influence of the loaded spring, the stock roll reduces in diameter as the liner roll builds up and, when the liner roll reaches 5½ inches in diameter the stock roll goes down to approximately 4 inches in diameter. At this time, the liner roll is turning approximately 0.73 revolutions and the 54 tooth sprocket is turning 0.61 revolutions for one revolution of the stock roll. The spring is still unwinding at about 0.12 of a revolution for each revolution of the stock roll, thereby indicating that the potential force of the spring is directly proportional to the speed of unwinding and to the number of turns still left in the spiral coil of the spring.

I have found that with the foregoing arrangement the spring has only about 11½% as much potential drive after the end of the completed run when the stock roll is emptied as it had at the start. In the above example, the full stock roll had 25 pounds of stock with a 6⅜ inch diameter center of gravity or a 3 3/16 inch torque arm, while the nearly empty stock roll had only 1 pound or less of stock on a 2 inch torque arm to make the indicated forces just about correct for the required drive. The 25 lb. load for a full stock roll on a 3 3/16 inch torque arm and the 1 lb. load acting through a 2 inch torque arm on the empty stock roll provides a load ratio of approximately 0.025:1. When the stock roll was full, the spring in the above example was designed to have 18 wraps or windings and was left with approximately 4½ wraps when the stock roll was empty so that the potential energy in the spring at the end was 25% of that at the beginning and the drive ratio was approximately 0.027:1.

It will be apparent from the foregoing that various sizes of stock rolls can be accommodated in a tire building apparatus of the type described by selecting the proper size liner roll and sprocket wheels in accordance with the above-noted predetermined relationship for a suitable size motor spring member. The motor member is loaded at the charging station for selective release and motivation of the system at a discharge station and the release can be remotely controlled by a solenoid operated brake that may in turn be synchronized in operation, with the tire building drum drive to provide a fully automatic positive feed of tire building material that is independent of the tire building drum and therefore not subject to stretching and distortion of the building material.

I have shown and described what I consider to be the preferred embodiment of my invention, along with suggested modified forms, and it will be obvious to those skilled in the art that other changes and modifications may be made without departing from the scope of my invention as defined by the appended claims.

I claim:

1. In a tire-building apparatus having a supply roll of tire building material interleaved with a liner sheet and a liner receiving and storage roll, each mounted on a shaft which is rotatably supported in parallel spaced relation from the other and wherein the rolls are interconnected through the medium of the liner, the combination comprising, a first wheel fixed on the supply roll shaft and another wheel mounted for free rotation on the liner roll shaft adjacent said first wheel, flexible means drivingly inter-connecting said wheels, a spiral spring motor encircling the liner roll shaft and having one end connected to the liner roll shaft and the other end connected to the freely rotatable wheel on said liner roll shaft for driving coaction therebetween, the diameter of each of said wheels having a pre-determined relationship to the diameter of the other and to the diameter of each of said rolls to provide a gear ratio therebetween that will cause rotation of the rolls in a material unwinding and liner receiving direction respectively when the spring motor is wound about the liner shaft, and releasable brake means coacting with said interconnected wheels to selectively prevent their rotation.

2. The apparatus of claim 1 wherein said pre-determined relationship is such that the ratio of the diameter of the supply roll wheel to the diameter of the liner roll wheel is less than the ratio of the diameter of the supply roll to the diameter of the liner roll throughout the operative range of the apparatus.

References Cited in the file of this patent

UNITED STATES PATENTS

| | | |
|---|---|---|
| 97,586 | Ayer | Dec. 7, 1869 |
| 1,875,111 | Nieman | Aug. 30, 1932 |
| 1,952,904 | Bostwick | Mar. 27, 1934 |

FOREIGN PATENTS

| | | |
|---|---|---|
| 647,545 | Great Britain | Dec. 13, 1950 |